(12) United States Patent
Owen

(10) Patent No.: US 7,517,458 B2
(45) Date of Patent: Apr. 14, 2009

(54) PROCESS OBTAINING LANDFILL DISPOSABLE WASTED FROM HYDROCARBON CONTAINING SLUDGE

(75) Inventor: David Malcolm Owen, Whitchurch (GB)

(73) Assignee: Treatchem Ltd, Warrington (GB)

(*) Notice: Subject to any disclaimer, the term of this patent is extended or adjusted under 35 U.S.C. 154(b) by 439 days.

(21) Appl. No.: 10/569,898

(22) PCT Filed: Aug. 27, 2004

(86) PCT No.: PCT/GB2004/003693

§ 371 (c)(1),
(2), (4) Date: Feb. 28, 2006

(87) PCT Pub. No.: WO2005/021444

PCT Pub. Date: May 10, 2005

(65) Prior Publication Data

US 2006/0283807 A1    Dec. 21, 2006

(30) Foreign Application Priority Data

Aug. 29, 2003  (GB) ................. 0320270.2

(51) Int. Cl.
*C02F 11/14* (2006.01)
(52) U.S. Cl. .................... 210/708; 208/13; 208/188; 210/710; 210/734; 210/772; 210/778; 210/808
(58) Field of Classification Search ............. 210/808
See application file for complete search history.

(56) References Cited

U.S. PATENT DOCUMENTS

| 4,383,927 | A | | 5/1983 | Srivatsa | |
|---|---|---|---|---|---|
| 4,417,976 | A | | 11/1983 | Sander | |
| 4,851,123 | A | * | 7/1989 | Mishra | 210/609 |
| 5,198,123 | A | * | 3/1993 | Stover et al. | 210/791 |
| 5,271,851 | A | * | 12/1993 | Nelson et al. | 210/770 |
| 6,039,880 | A | * | 3/2000 | Morataya | 210/708 |
| 6,514,418 | B1 | * | 2/2003 | Bartscherer et al. | 210/709 |
| 7,156,993 | B2 | * | 1/2007 | Hermann et al. | 210/231 |

FOREIGN PATENT DOCUMENTS

GB     2095573     10/1982

* cited by examiner

*Primary Examiner*—Peter A Hruskoci

(57) ABSTRACT

A method of processing oily sludge to remove a substantial proportion of the water and hydrocarbon content therefrom to form a solid cake of waste material that is suitable for disposal in land fill sites. The method involving, firstly promoting flocculation in a batch of waste material by mixing in a flocculating agent. The flocculated waste material is then pressing at a first pressure to extract substantially all the free water within the mixture. After the first pressing the waste material is subjected to a second pressing at a second pressure to extract a substantial proportion of hydrocarbon material and further water from the mixture, thus leaving a solid cake of waste material. The invention also considers additional processing steps to maximize the level of hydrocarbon material reclaimed from the waste material.

10 Claims, No Drawings

PROCESS OBTAINING LANDFILL DISPOSABLE WASTED FROM HYDROCARBON CONTAINING SLUDGE

FIELD OF THE INVENTION

The present invention relates to the field of waste material treatment and more specifically to the area of the treatment of sludge that contains, amongst other things, hydrocarbons.

BACKGROUND OF THE INVENTION

The processing and disposal of waste material is an important area of environmental management. Generally speaking waste material is either burnt or buried at landfill sites. Some waste is not suitable for disposal by burning and is thus buried (landfill) or simply spread over an area of land (landfarm). However, some waste material is not suitable for such disposal methods.

Oily sludge is an example of a waste material that cannot suitably be disposed of by burning. Also, because of the fluid nature of oily sludge it can not be simply buried at landfill sites either. This is because, under present legislation, waste material must be buried in a solid form. The practice of landfarming is also undesirable for environmental reasons.

The appearance of said sludge is that of thick mud and it is usually unsuitable to be further dewatered by pressing (e.g. belt press, chamber press) or centrifuging to the required dryness and shear stability for landfill; especially without chemically treating the sludge.

Under impending legislation waste, nominally solid, having an oil content of greater than certain specified values (i.e. 0.1%, 5%, 6%) will result in the material being classified as hazardous. The specified oil content of a particular batch of waste will determine the eventual route of disposal available for the waste.

Waste with an oil content of between above 0.1% and 5% can be disposed of at hazardous waste sites and non-hazardous waste sites, provided they have special cells. Waste having an oil content of 6% and over must be disposed of at a hazardous waste site. This distinction can create significant cost differences between batches of waste having an oil content of 5% and waste having an oil content of 6%, mainly due to transport costs and landfill site costs.

In view of the legal, financial and environmental requirements, it is obviously more preferable to produce waste having an oil content of less that 6%, and yet more preferably 0.1% or below. In view of the above situation, at present oily sludge is processed to ensure that it is in the necessary state for disposal.

The pretreatment processes currently in use for oily sludge, which include the solidification of the sludge using absorbents, are both expensive and wasteful as they may not involve the reclamation of any of the hydrocarbons held within the sludge. Other techniques such as thermal drying and desorption of hydrocarbons may be used but these are expensive and energy intensive processes.

In light of the state of the art there is a need for a method of processing oily sludge to transform it into a form that can be more suitably disposed of. The processing method of the present invention is targeted mainly at the treatment of oily sludge that arises from refineries and waste oil recovery/treatment plants, where waste oil and oily sludge are recovered to make fuel oil from industrial waste oil and garage forecourt recycling schemes.

It is generally accepted that plate and frame (or chamber) presses are not suitable for processing oily sludge due to the likelihood of blinding. As a result, belt presses are usually used in the processing of oily waste. Typically, a belt press can only achieve a maximum of 20% solids and a minimum of 10% oil, which as a ratio of 2:1. There is therefore a need for a method of achieving waste with a much lower solid content to oil content ratio.

SUMMARY OF THE INVENTION

Accordingly, the present invention provides a method of processing oily sludge to remove a substantial proportion of the water and hydrocarbon content therefrom to form a solid cake of waste material, comprising the steps of:

a) providing a batch of a waste material;

b) promoting the flocculation of the waste material by mixing in a flocculating agent;

c) firstly pressing the mixture at a first pressure to extract substantially all the free water within the mixture; and d) secondly pressing the mixture at a second pressure to extract a substantial proportion of hydrocarbon material and further water from the mixture, leaving a solid cake of waste material.

Preferably, additional water is added to the waste material before a flocculating agent is added to the waste material. Although the addition of water greatly assists that flocculation of the waste, it is not always essential with some flocculating agents.

Preferably, the water is added to the oily sludge in a volume/volume ratio of 2:1.

Alternatively, the amount of water added is such that the flocculent used in stage b) of the method is diluted to between 0.1 times and 50 times the volume of the waste material.

Once the solid cake of waste material has been produced it can be disposed of in a landfill site.

The present invention is intended to be utilized to process sludge waste material with hydrocarbon content.

Preferably, the first pressing applies a first pressure of up to about 7 bar. The second pressing may apply a second pressure of 13 bar or above.

Preferably, the flocculating agent is a synthetic polyelectrolyte of an acrylamide copolymer type. Preferably, flocculation is promoted by mixing in a 0.5% solution of a cationic polyacrylamide flocculent emulsion polymer at a dose rate between 0.1 and 15 kg/tonnes of dry solids. The flocculation of the mixture may be improved by the gentle stirring of the mixture.

It will be appreciated that flocculation may be achieved by the use of any suitable form of flocculation system including, but not limited to acrylamide copolymers, multiple component systems based on coagulant and flocculent sequential additions, inorganic mixed components such as bentonite and cationic acrylamide and synthetic micro-particle systems.

The filtering of the mixture to extract the free water is carried out using a chamber press with a suitable filter clothing.

It may also be preferable to use a chamber press to extract the hydrocarbon material and further water from the mixture. Alternatively, a centrifuge can be used to apply the necessary pressure to the mixtures.

Preferably, the pressure of above 13 bar is maintained for 2 hours so as to remove the optimum amount of hydrocarbon material from the mixture.

The steps of removing the free water and then the hydrocarbon material and further water could be carried out using the same chamber press.

A further benefit could be gained if the oily sludge was screened prior to the addition of water, so as to remove large debris from the sludge material.

Another benefit could be gained by pre-washing the oily sludge with a hydrocarbon based solvent before the water is added to the sludge, so as to remove more hydrocarbon material. A low boiling point solvent may be readily removed from the cake to achieve very low residual hydrocarbon content by evaporation.

The waste material may be washed in situ within the press, at any stage of the process, with a suitable oil dispersant surfactant solution. The type of surfactant used will vary depending on the different types of oil present in the waste material. Using chemically compatible proprietary surfactant packages at any stage of the process leads to a further reduction in the oil content of the final solid cake.

It will also be appreciated that the oil content of the final solid cake itself may be further reduced by a further round of washing in a surfactant solution followed by re-pressing.

Preferably, the water used for this pretreatment could be the free water extracted from the oily sludge during the processing of an earlier batch.

DETAILED DESCRIPTION OF THE INVENTION

For the sake of the present invention, the preferred waste materials of oily sludge should be understood to be sludge that results from processes wherein the resultant sludge is a mixture of liquid hydrocarbon, organic liquids or natural fats, water and solid material in any proportion. Usually, the maximum percentage values of the components of such sludge are about 40% for liquid hydrocarbon, about 90% for water and 20% for solids.

The process on the invention deals with these types of sludge by addressing the fundamental problem associated with a three phase system presented in sludge. Typically a sludge is presented that has the rheology associated with mud or the like.

Analysis shows the following content of a typical oily sludge:

|  |  |
|---|---|
| Hydrocarbon | 20% |
| Solids | 10% |
| Water | 70% |

It is known that the addition of flocculents such as polyelectrolytes may be used to assist in the dewatering of regular solids/water sludge. Normally an admixture of an appropriate synthetic polyelectrolyte solution in water to a slurry will produce flocculation of the solids so that water may be drained therefrom using a suitable dewatering device such as a filter press or centrifuge. The resultant cake produced will be solid in nature if enough water is removed.

However, in the case of oily sludge it is not enough to remove just the water as the resultant material will still contain hydrocarbon fluids, which in admixture with the solids therein produces a further sludge-like material, albeit at a lower level of water content. Such material is still semi-solid and cannot be disposed of as landfill.

Further, it was found that for oily sludge, large excess volumes of water are required before flocculation can take place. Thus the amount of sludge that would need to be treated would greatly increase in volume prior to dewatering. Thus in the present invention it is preferable to add water to the sludge to increase the volume. However the addition of water is not essential, as it is the stability of the floc within the press, during filling and squeezing, which is most important.

The mixture was stirred and admixture of a suitable flocculent, preferably synthetic cationic polyelectrolyte, was added to cause complete flocculation of the sludge to an oil/solids coagulate and water external phase.

The mixture was then admitted to a chamber press, with suitable filter clothing, at pressures up to about 7 bar. The press filled with sludge and essentially oil free water was discharged.

The press was opened and an oily sludge, which was of a reduced volume to the original sludge volume, was found to be produced. However this sludge was still unsuitable for landfill, as it was semisolid and still full of oil.

The treated sludge was again admitted to the chamber press, but after filling, the inlet valve to the chambers was closed. The membranes in the inner chamber spaces were inflated to a pressure of above 13 bar (about 15 bar) for approximately 2 hours. A further discharge was observed from the press which consisted of a small amount of water along with oil, both free and emulsified.

After this procedure, upon opening of the press a solid cake, which was substantially reduced in water and oil, was found to have been produced. A sample press produced 71% dry solids, with approximately 5% hydrocarbon content. This cake was suitable for landfill in a hazardous waste landfill site.

The sludge volume reduction was substantial and the cake consistency was brittle.

Experimental

A typical refinery waste sludge was obtained from a UK refinery and treated as follows.

Sample (200 ml) was diluted 2:1 with fresh water and resultant mixture was homogenized by stirring. The sample volume now 600 ml.

Addition of 100 ml 0.5% polymer solution of Treatchem 104 supplied by Treatchem Ltd, Whitchurch, England was made with gentle stirring.

The whole mixture flocculated to give a granular appearance and free water.

The mixture was admitted to a Buchner filter funnel fitted with a woven filter cloth of polypropylene and allowed to drain.

Essentially only free water was removed and the water separated was very low in free oil. The resultant drained sludge had a volume of less than the original 200 ml but was essentially sloppy and extremely oily.

The content of the filter was then emptied into a woven piece of cloth which was folded around the sludge and gently screwed up such that excess pressure was applied to the sludge. It was noticed that a substantial amount of oil and water started to separate through the cloth and that the contents therein were becoming more solid in nature.

To confirm the feasibility of the technique on an industrial scale a pilot scale, chamber press was obtained for trials. The chambers were 300 mm in diameter and the press was fitted with membrane plates capable of exerting pressures up to 15 Bar.

An 8 kg sample of oily sludge from a waste processing facility was taken and screened to 1 mm to remove large debris. The sample was mixed with water (12 liters) and conditioning flocculent added as a 0.5% solution until complete flocculation had taken place.

The mixture was admitted to the press via a small air driven piston pump up to 7 bar when the press was full and excess water had been removed. Again very little oil was seen in the filtrate up to this point The filling of the press was rapid (approximately 15 minutes).

The inlet valve was closed to the press and pressure applied to the membranes at 15 bar for approximately 2 hours. A discharge of oily water was observed from the press which became richer in oil over time. The volume of discharge decreased with time as the contents of the press are a fixed amount.

Upon opening the press a 1.8 kg hard cake was discharged containing approximately 5% oil (toluene extractable) and approximately 71% dry solids. The cake was adjudged suitable for admission to a hazardous landfill site.

Repeating the same experiment using 7 bar squeeze on the sludge for 2 hours produced a sloppy oily sludge. It now becomes apparent that a two-stage press is required to obtain removal of the hydrocarbon fluid.

The method may be extended to washing the sludge beforehand with a solvent, especially of a low boiling point or volatile nature, to remove more hydrocarbon and the water used may be recovered water from the press.

The two-stage method is applied in a single device comprising a membrane filter press. The pressure required will be driven by the sludge characteristics. It is noted that the pressure required to squeeze organic material/oily material from the waste material depends upon the viscosity/solvency of the organic material/oily material. In fact, it was found that white spirit could be exhausted from a sample of waste material using the present method to apply a pressure of only 3-4 bar.

Whilst it is discussed above that a pressure of 13 bar or above for the second pressing stage is the preferred minimum requirement, the preferred maximum is only limited by the technical tolerances of the separating device being used to press the waste. material It is appreciated that although the process of the present invention is particularly suitable for the processing of oily sludge, the process could also be used to process other mixtures to remove the required contents.

The invention claimed is:

1. A method of processing oily sludge waste containing hydrocarbon oil to remove a substantial proportion of the water and hydrocarbon content therefrom to form a solid cake of waste material, comprising the steps of:
   a) providing a batch of an oily sludge waste material;
   b) promoting the flocculation of the waste material by mixing in a flocculating agent;
   c) pressing the mixture in a membrane chamber press at a first pressure to extract substantially all the free water within the mixture; and
   d) subsequently pressing the mixture in the same chamber press at a second higher pressure to extract a substantial proportion of hydrocarbon material and further water from the mixture, leaving a solid cake of waste material, wherein the first pressure is up to about 7 bar, and the second pressure is 13 bar or above.

2. The method of claim 1, wherein additional water is added to the oily sludge waste material before a flocculating agent is added to the waste material.

3. The method of claim 2, wherein the water is added to the oily sludge in a volume/volume ratio of 2:1.

4. The method of claim 2, wherein the amount of water added is such that the flocculating agent used in stage b) of the method is diluted to between 0.1 times and 50 times the volume of the oily sludge waste material.

5. The method of claim 1, wherein, the flocculating agent is a synthetic polyelectrolyte of an acrylamide copolymer.

6. The method of claim 1, Wherein flocculation is promoted by mixing in a 0.6% solution of a cationic polyacrylamide flocculent emulsion polymer at a dose rate between 0.1 and 15 kg/tonnes of dry solids.

7. The method of claim 1, wherein the filtering of the mixture to extract the free water is carried out using a chamber press with a suitable filter clothing.

8. The method of claim 1, wherein the second pressure is maintained for 2 hours above 13 bar.

9. The method of claim 1, further comprising a pretreatment stage wherein the oily sludge waste material is screened to remove large debris from the sludge material.

10. The method of claim 1, further comprising the washing of the oily sludge waste material in situ within the press with an oil dispersant surfactant solution.

\* \* \* \* \*